United States Patent [19]

Savit et al.

[11] 4,455,500
[45] Jun. 19, 1984

[54] SENSITIVITY AND CAPACITANCE ADJUSTMENT METHOD FOR PIEZOELECTRIC ACCELEROMETERS

[75] Inventors: Carl H. Savit; Robert C. Shopland, both of Houston, Tex.

[73] Assignee: Western Geophysical Company of America, Houston, Tex.

[21] Appl. No.: 517,899

[22] Filed: Jul. 28, 1983

[51] Int. Cl.³ ............................................. H01L 41/08
[52] U.S. Cl. ..................................... 310/312; 310/329; 29/25.35
[58] Field of Search ................ 310/312, 322, 324, 329; 29/25.35

[56] References Cited

U.S. PATENT DOCUMENTS 2,870,521  1/1959  Rudnick ........................... 310/312 X
4,050,126  9/1977  Ikeno ................................ 310/312 X

FOREIGN PATENT DOCUMENTS 2335495  1/1975  Fed. Rep. of Germany ...... 310/312
2828048  1/1979  Fed. Rep. of Germany ...... 310/312
52-32651  3/1977  Japan .................................... 310/312
54-99588  8/1979  Japan .................................... 310/312
55-114015  9/1980  Japan .................................... 310/312

*Primary Examiner*—Mark O. Budd
*Attorney, Agent, or Firm*—William A. Knox

[57] ABSTRACT

A dual-transducer accelerometer, having a liquid inertia mass is disclosed. Each transducer consists of a ceramic PZT piezo-electric wafer glued to a flexible substrate. Certain characteristics of sensitivity and capacitance of one transducer can be matched to similar characteristics of an arbitrarily-selected standard by laser-trimming the ceramic wafer.

7 Claims, 7 Drawing Figures

SENSITIVITY AND CAPACITANCE ADJUSTMENT METHOD FOR PIEZOELECTRIC ACCELEROMETERS

BACKGROUND OF THE INVENTION

1. Field of the Invention

This invention relates to construction of dual-crystal accelerometers having a liquid inertial mass. A method is provided for balancing certain electrical characteristics between the two crystals.

2. Discussion of the Prior Art

Accelerometers employing dual piezo-electric wafers having a liquid inertia mass contained in a chamber between the two crystals have been disclosed in U.S. Pat. No. 4,334,296, issued June 8, 1982 in the name of E. M. Hall, Jr. and assigned to the assignee of this invention.

One of the problems associated with that type of accelerometer is the problem of matching the capacitance and the sensitivity of the two piezo-electric wafers so that the electrical output signals of the two wafers will be comparable. A means for sensitivity-matching was disclosed in U.S. Pat. No. 4,395,908, issued Aug. 8, 1983 to R. C. Shopland, also assigned to the assignee of this invenion. In that patent, a threaded end cap is provided that may be rotated to apply a greater or lesser tension to one of the wafers to match its sensitivity to that of the second of the two wafers. But that method affected only sensitivity, not capacitance.

It is therefore an object of our invention to provide a method for matching both the sensitivity and the capacitance of the two piezo-electric wafers of a dual-crystal accelerometer.

SUMMARY OF THE INVENTION

In accordance with an aspect of this invention, the electrode material on the upper side of a piezo-electric crystal assembly, as well as a small portion of the ceramic compound that forms the active wafer of the assembly, is laser-trimmed according to a desired regimen to adjust the capacitance and/or the sensitivity of a crystal transducer assembly relative to match that of another assembly.

In accordance with one aspect of this invention a small percentage of the total area of the wafer electrode and a portion of the ceramic material is trimmed to a shallow depth to decrease the capacitance and sensitivity of the crystal assembly.

In accordance with another aspect of this invention, a small percentage of the total area of the wafer electrode and a portion of the ceramic is trimmed to an intermediate depth to vary substantially only the capacitance of the crystal assembly.

In accordance with a further aspect of this invention, a small percentage of the total area of the wafer electrode and a portion of the ceramic is trimmed to a deep trim depth to increase the sensitivity and to decrease the capacitance of the crystal assembly.

In accordance with yet a further aspect of this invention, given a constant trim depth and trim area the sensitivity of the assembly is increased, without changing the capacitance, in proportion to the radius of the trim pattern from the center of the wafer.

DETAILED DESCRIPTION OF A PREFERRED EMBODIMENT

Figure 1:
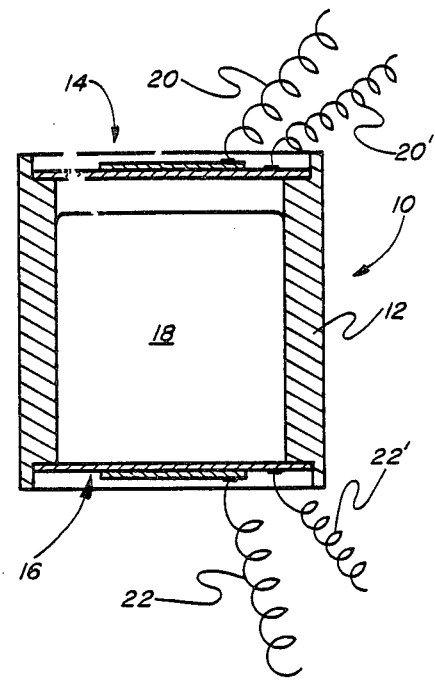
FIG. 1 is a simplified cross-sectional view of a liquid-mass, dual-crystal accelerometer.

Referring now to FIG. 1, in its simplest form, the accelerometer 10 incorporating this invention, consists of a cylindrical chamber 12 closed at each end by a piezo-electric crystal transducer assembly 14 and 16. The interior of the chamber contains a volume of a liquid inertia mass 18 such as mercury. Generally the chamber is nearly but not completely full. A 95% fill is common. Conductors such as 20, 20' and 22, 22' deliver the output signals of the transducer assemblies to a signal utilization device. The entire accelerometer may be contained within an outer case, not shown, of any desired type.

Customarily, the accelerometer of the type described, is used by laying the unit on its side so that the mercury presses on both crystal assemblies. Positioned in that fashion, the accelerometer is capable of sensing both horizontally and vertically-propagating accelerating forces. The orientation of the accelerometer structural axes is not critical.

Figure 2:
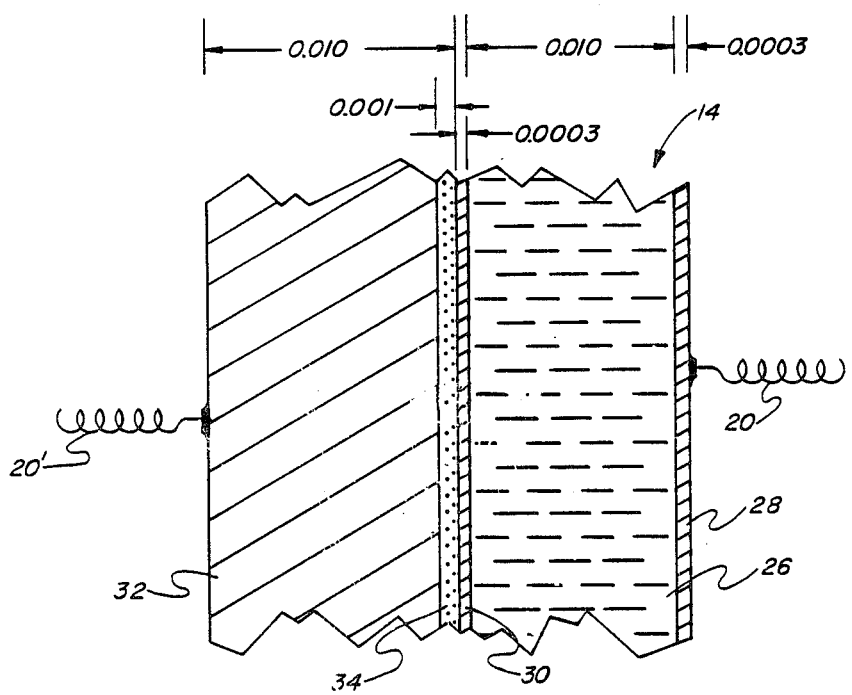
FIG. 2 is a cross-sectional view of a piezo-electric crystal transducer assembly.

FIG. 2 is a cross section of a piezo-electric crystal transducer assembly such as 14 showing the dimensions of the component parts. All dimensions are in inches. An assembly 14 consists of a ceramic-wafer sensing element 26 composed of a piezo-electric material such as lead zirconate titanate (PZT), that is coated top and bottom by thin metallic electrodes 28, 30, of a metal such as nickle or silver. The wafer is secured to a beryllium copper substrate 32 by a conductive epoxy layer 34. Electric leads 20, 20' are connected to upper electrode 28 and to substrate 32 respectively.

Figure 3:
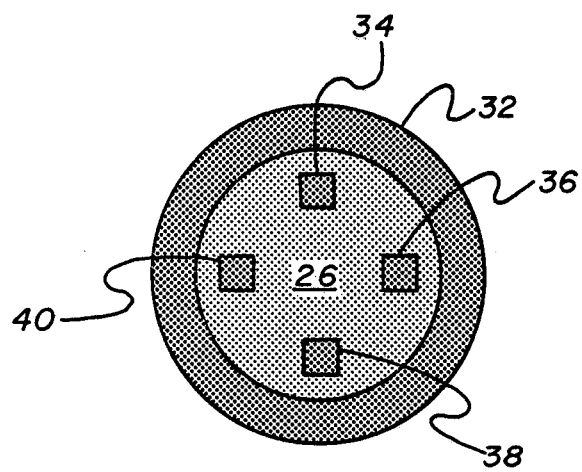
FIG. 3 is a plan view of a ceramic wafer that has been trimmed according to the teachings of this invention.
Figure 4:
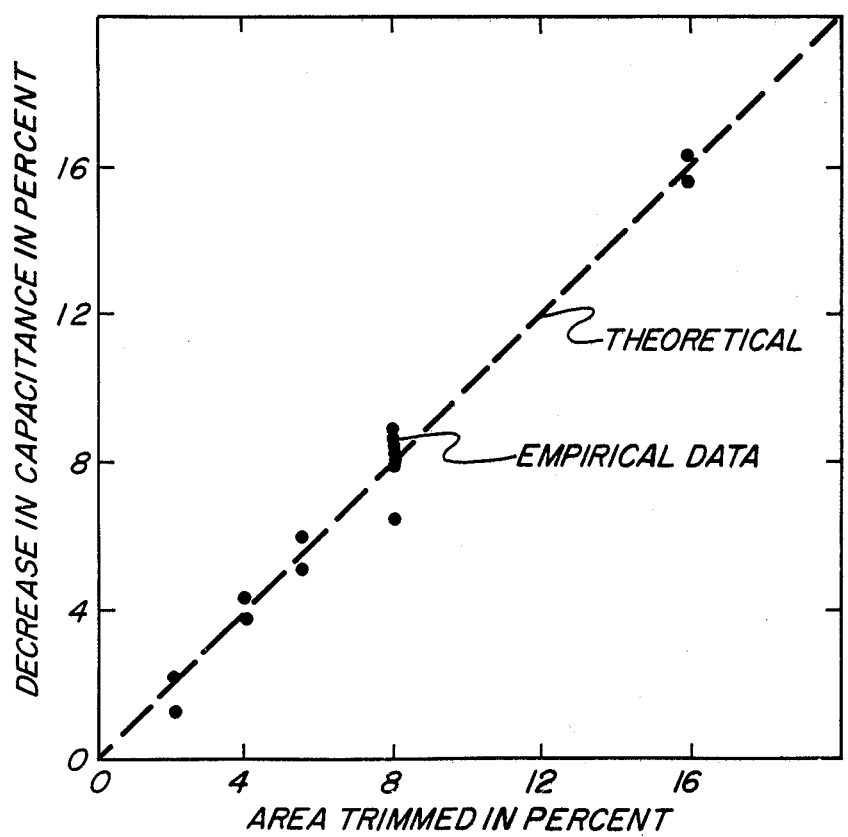
FIG. 4 is a graph of the percentage change in capacitance relative to the percentage of the area of electrode material trimmed.

In accordance with this invention, certain desired characteristics of the crystals transducer assembly may be adjusted by laser-trimming away a desired percentage of the ceramic wafer 26 and/or removal of a desired percentage of the total area of the electrode material from the upper electrode 28. In practice, the material is vaporized by a laser beam. A laser trimming device such as a Model 44 Laser Trimming System, made by Electro Scientific Industries of Portland, OR, may be used to produce a desired pattern of vaporization spots 34, 36, 38, 40 on ceramic wafer 26 as shown in FIG. 3. In FIG. 3, the spots are square but they could just as well have been circular or crescent-shaped had the Laser Trimmer been so programmed. The spot pattern in FIG. 3 includes four spots as shown but more or fewer could be used. In the preferred arrangement, the spots are arranged in a symmetrical pattern around the perimeter of a circle having a selected radial distance from the center of the wafer. For special purposes, the location of the spot pattern could be offset from center.

The purpose of laser-trimming a ceramic-wafer sensing element is of course, to adjust certain characteristics of one transducer assembly such as 14, to match similar characteristics of another transducer assembly such as 16, of accelerometer 10. For purposes of this invention, two of the characteristics of interest are capacitance and sensitivity. It will be assumed that one of the transducer assemblies such as 14 has already been trimmed to meet some recommended specification and therefore it constitutes an arbitrarily-selected standard. The task is then to adjust the desired characteristics of the other transducer assembly such as 16 relative to the arbitrarily-selected standard. Adjustable parameters are trim depth, cross-sectional area of the vaporization spots and location and distance of the spot pattern from center.

The preferred method of accomplishing our purpose is best illustrated by the graphs of FIGS. 4–7, studied in conjunction with the following comments.

In the matter of trim depth, we have discovered that there are three trim depth ranges. Each depth range produces strikingly different effects, which will be next explained with reference to the experimentally-produced graphs.

A shallow trim depth lies in the range of 0.3 to about 0.8 mils, averaging about 0.55 mils. At that trim depth the electrode material is removed but penetration of the ceramic material is minimal.

The intermediate trim depth lies between 1 and 3 mils. At that trim depth, both electrode material and a substantial amount of ceramic is vaporized.

A deep trim depth is considered to be 10 mils. At that depth, nearly all of the ceramic material down to the substrate is removed within the confines of a given spot.

As might be expected, at any trim depth, the relative decrease in capacitance is linear in direct proportion to the relative area of the trimmed vaporization spots. See FIG. 4. Not so, however for sensitivity.

Figure 5:
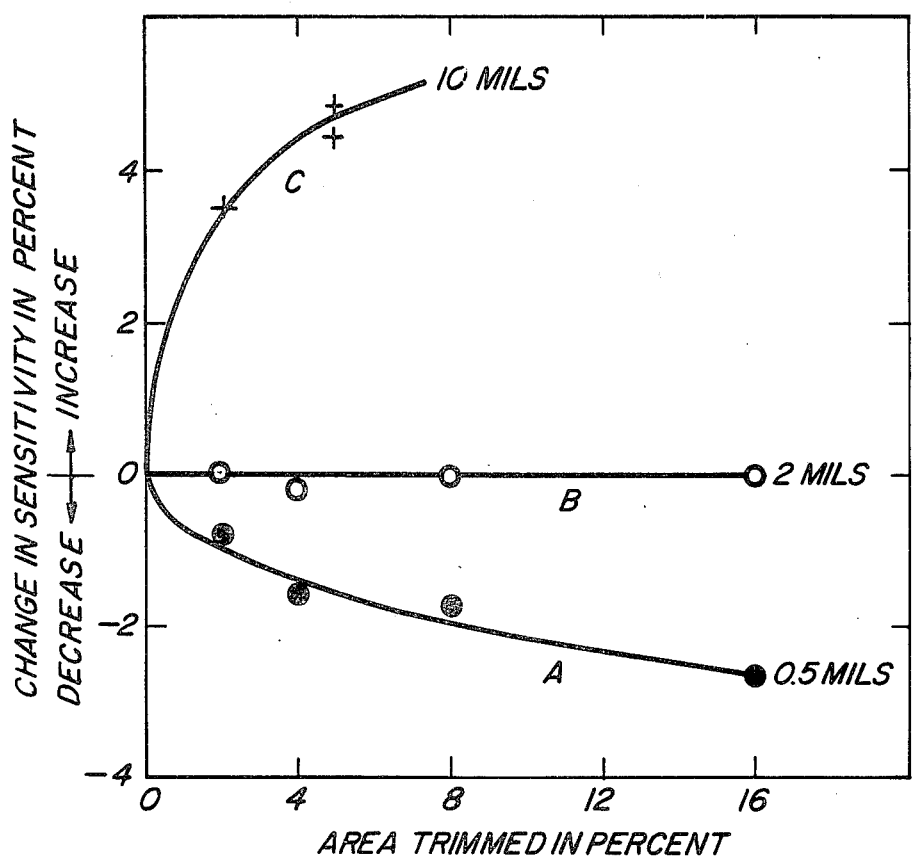
FIG. 5 is a graph showing the change in sensitivity with respect to area trimmed at each of three constant trim depths.

Referring now to FIG. 5, at constant shallow trim depths, sensitivity decreases in relation to the area trimmed. Probably the sensitivity decrease is due to a loss of effective dielectric material.

For constant intermediate trim depths, the sensitivity appears to be substantially independent of the area trimmed. That effect is not fully understood but it may be due to a combination of mechanical as well as electrical effects.

At constant deep trim depths, sensitivity increases in proportion to an increase in the trimmed area. We believe that the effect may be due to increased compliance of substrate 32 or, perhaps also of the entire assembly 14 taken as a whole, due to increased removal of wafer material.

Figure 6:
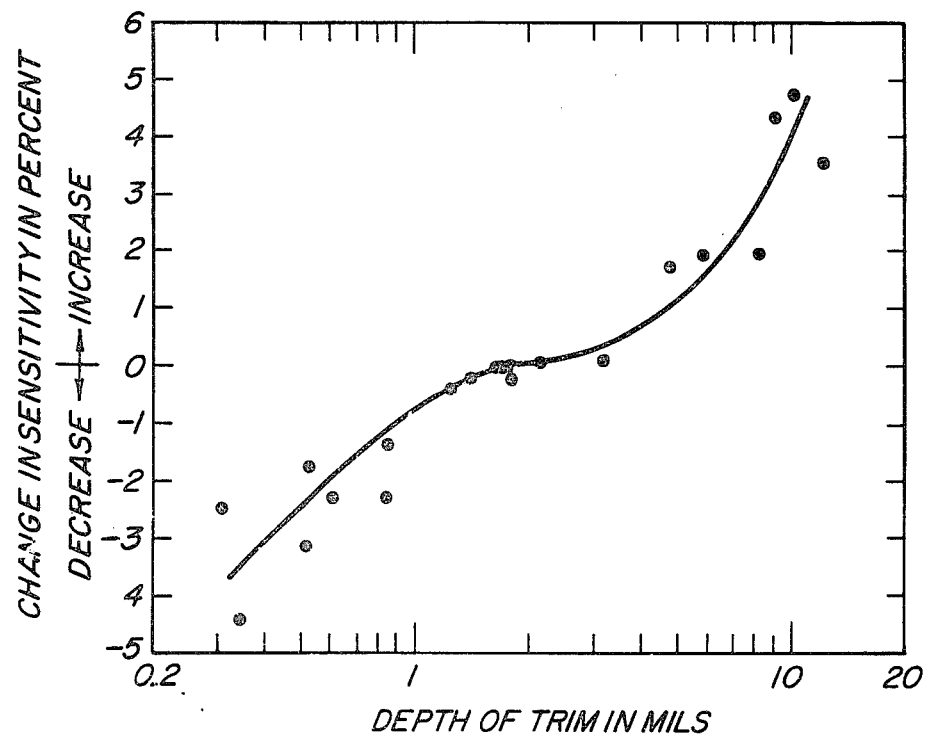
FIG. 6 is a graph showing the change in sensitivity relative to depth of trim for constant area.

FIG. 6 illustrates the dependence of sensitivity on trim depth. This graph tends to support the data plotted in FIG. 5.

Figure 7:
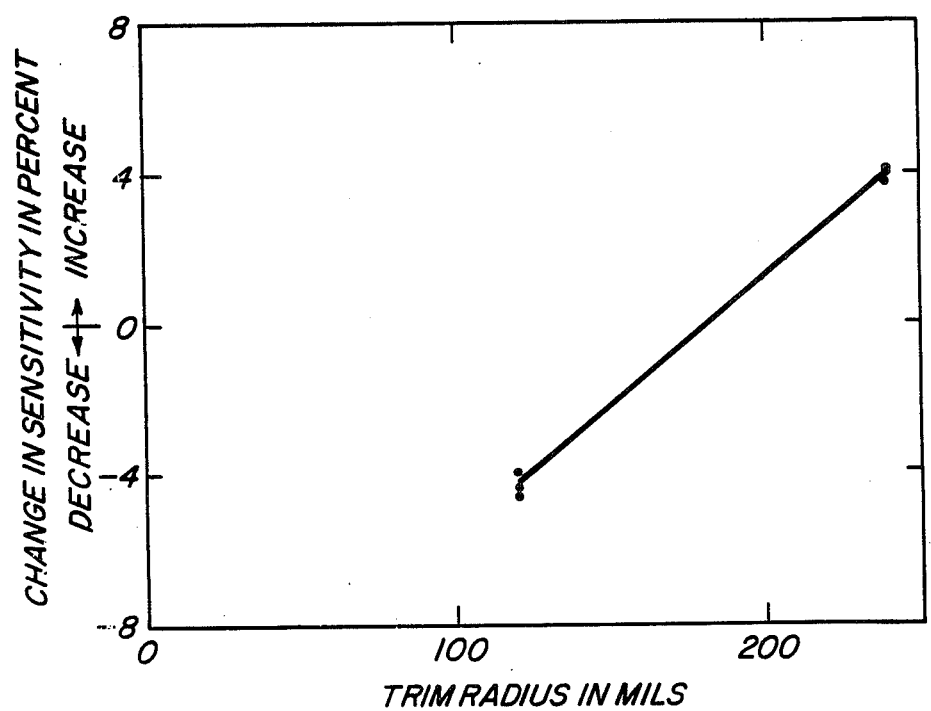
FIG. 7 is a graph showing the sensitivity as a function of the distance from center of the spot pattern.

During the course of our experiments involving laser trimming of the ceramic-wafer sensing elements, we were surprised to discover that, for a given trim area and trim depth, the sensitivity of a crystal transducer assembly also is a function of the radial distance of the trim pattern relative to the center of the ceramic wafer. As shown by FIG. 7, as much as a 4% change in sensitivity may be observed by changing the radius of the trim pattern by forty or fifty mils one way or the other, relative to some empirically defined critical radial distance. The reason for this unexpected effect is not clear, but it may be related to a mechanical change in the mechanical compliance of an assembly such as 14.

The measurements disclosed herein are empirical, based upon a transducer assembly having the approximate dimensions and structure as shown in FIG. 2, and wherein the ceramic sensing unit has a radius of 400 mils. The numerical results are merely illustrative of our method for adjusting desired characteristics of a transducer assembly relative to an arbitrarily-selected standard, and in no way limit the scope of the appended claims.

In this disclosure, we have not attempted to describe methods for laser trimming and for testing desired characteristics of the crystal transducer assemblies. Such methods are well known to the art and per se form no part of this invention.

Our discoveries have been described in connection with an accelerometer having a liquid inertial mass. That description is of course exemplary only. Powdered metals or a colloidal mixture of a dense solid, suspended in a liquid, could also be used.

We claim as our invention:

1. In a piezo-electric crystal transducer assembly including ceramic-wafer electroded sensing element, a method for adjusting the sensitivity and capacitance of the assembly relative to an arbitrarily-selected standard, comprising:
    laser-trimming a symmetrical pattern of vaporization spots on a ceramic wafer, the spots having desired dimensions of trim depth, trim area and trim-pattern distance and location, that are selected in accordance with a desired degree of adjustment in sensitivity and capacitance.

2. The method as defined by claim 1, comprising the steps of:
    laser-trimming a symmetrical pattern of vaporization spots on the ceramic wafer, said spots all having substantially constant depths and cross-sectional areas; and
    adjusting the sensitivity of said crystal assembly by adjusting the dimension and location of the spot pattern with respect to the center of said ceramic wafer.

3. The method as defined by claim 2, comprising the steps of:
    defining a critical distance for said ceramic wafer;
    increasing the sensitivity of a crystal transducer assembly in relationship to the distance of said spot pattern from said center when said spot pattern lies outboard of said critical distance; and
    decreasing the sensitivity of the crystal transducer assembly in relationship to the distance of said spot pattern when said spot pattern lies inboard of said critical distance.

4. The method as defined by claim 1, comprising the steps of:
    laser-trimming a spot pattern on a ceramic wafer, said spots having a substantially constant shallow trim depth, said spot pattern having a selected distance from center; and
    decreasing the sensitivity and capacitance, relative to said standard, of a crystal transducer assembly in relationship to the areas of said spots.

5. The method as defined by claim 1, comprising the steps of:
    laser-trimming a spot pattern on a ceramic wafer, said spots having a substantially constant intermediate trim depth, said spot pattern having a constant selected distance from center; and decreasing the capacitance, relative to said standard, of a crystal transducer assembly in relation to the areas of said spots without substantially altering the sensitivity.

6. The method as defined by claim 1, comprising:

laser-trimming a spot pattern on a ceramic wafer, said spots having a substantially constant deep trim depth, said spot pattern having a selected constant distance from center; and decreasing the capacitance of a crystal transducer assembly relative to a standard in relation to the spot areas;

increasing the sensitivity of the assembly relative to the standard in relationship to the spot areas.

7. The method as defined by claim 1, comprising the further steps of:

laser-trimming a pattern of spots on a ceramic wafer, said spots having a substantially constant area, the spot pattern being positioned around a constant selected radius; and increasing the sensitivity, relative to the standard, of a crystal transducer assembly in relation to the depths of said spots.

* * * * *